US012512745B2

(12) United States Patent
Nagayoshi et al.

(10) Patent No.: US 12,512,745 B2
(45) Date of Patent: Dec. 30, 2025

(54) POWER CONVERSION DEVICE

(71) Applicants: KABUSHIKI KAISHA TOYOTA JIDOSHOKKI, Aichi-ken (JP); NATIONAL UNIVERSITY CORPORATION NAGAOKA UNIVERSITY OF TECHNOLOGY, Niigata-ken (JP)

(72) Inventors: Kenichi Nagayoshi, Kariya (JP); Takehiko Sumida, Kariya (JP); Junichi Itoh, Nagaoka (JP); Hiroki Watanabe, Nagaoka (JP)

(73) Assignees: KABUSHIKI KAISHA TOYOTA JIDOSHOKKI, Aichi-Ken (JP); NATIONAL UNIVERSITY CORPORATION NAGAOKA UNIVERSITY OF TECHNOLOGY, Niigata-Ken (JP)

( * ) Notice: Subject to any disclaimer, the term of this patent is extended or adjusted under 35 U.S.C. 154(b) by 0 days.

(21) Appl. No.: 18/825,111

(22) Filed: Sep. 5, 2024

(65) Prior Publication Data

US 2025/0091453 A1    Mar. 20, 2025

(30) Foreign Application Priority Data

Sep. 14, 2023  (JP) ................................ 2023-149381
Dec. 7, 2023   (JP) ................................ 2023-207069

(51) Int. Cl.
*B60L 50/60*     (2019.01)
*B60R 16/033*    (2006.01)
*B60R 16/04*     (2006.01)

(52) U.S. Cl.
CPC ............ *B60L 50/66* (2019.02); *B60R 16/033* (2013.01); *B60R 16/04* (2013.01); *B60L 2210/12* (2013.01)

(58) Field of Classification Search
CPC ...... B60L 50/66; B60L 2210/12; B60L 53/22; B60R 16/033; B60R 16/04; H02M 7/217;
(Continued)

(56) References Cited

U.S. PATENT DOCUMENTS

2003/0081440 A1*  5/2003  Komatsu ............... B60L 3/0023
                                                                363/132
2011/0134672 A1*  6/2011  Sato ........................ H02M 1/10
                                                                363/126

(Continued)

FOREIGN PATENT DOCUMENTS

JP    2020-127251 A    8/2020
JP    2023-38682 A     3/2023

*Primary Examiner* — Lincoln D Donovan
*Assistant Examiner* — Alex W Lam
(74) *Attorney, Agent, or Firm* — GREENBLUM & BERNSTEIN, P.L.C.

(57) ABSTRACT

A power conversion device includes two input terminals, a first converter, and two first output terminals configured to output power converted by the first converter. The first converter includes a switching circuit, a flying capacitor, and a reactor. The power conversion device includes a second converter configured to perform power conversion on a voltage across the flying capacitor as an input voltage, two second converter input terminals electrically connected to two ends of the flying capacitor, and two second output terminals configured to output power converted by the second converter. The second converter includes a primary-side circuit and a secondary-side circuit. The second converter is an isolated DC/DC converter in which the primary-side circuit and the secondary-side circuit are electrically isolated from each other.

7 Claims, 11 Drawing Sheets

(58) Field of Classification Search
CPC ........ H02M 1/009; H02M 1/088; H02M 3/01; H02M 3/07; H02J 7/00047; H02J 7/0013
See application file for complete search history.

(56) References Cited

U.S. PATENT DOCUMENTS

2014/0001838 A1* 1/2014 Watanabe ............... B60L 50/40
307/9.1
2018/0109193 A1* 4/2018 Hirota ................... H02M 3/335

\* cited by examiner

POWER CONVERSION DEVICE

CROSS-REFERENCE TO RELATED APPLICATIONS

This application is based upon and claims the benefit of priorities from prior Japanese Patent Application No. 2023-149381, filed on Sep. 14, 2023, and prior Japanese Patent Application No. 2023-207069, filed on Dec. 7, 2023, the entire contents of each of which are incorporated herein by reference.

BACKGROUND

1. Field

The present disclosure relates to a power conversion device.

2. Description of Related Art

A power conversion device disclosed in Japanese Laid-Open Patent Publication No. 2023-38682 is mounted on a vehicle. The vehicle includes a high-voltage battery and a low-voltage battery. The power conversion device converts power supplied from an external power supply and outputs the converted power to the high-voltage battery. This charges the high-voltage battery.

In some cases, a power conversion device is required to include multiple output terminals with different output voltages. For example, a power conversion device that supplies power to devices having different required voltages needs to include output terminals for the devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power conversion device includes two input terminals configured to be electrically connected to an external power supply, a first converter configured to convert power input from the external power supply via the two input terminals, and two first output terminals configured to output power converted by the first converter. The first converter includes a switching circuit in which a first switching element, a second switching element, a third switching element, and a fourth switching element are connected in series to each other in this order, a flying capacitor electrically connecting a connection node between the first switching element and the second switching element to a connection node between the third switching element and the fourth switching element, a reactor, a first output line electrically connecting one of the two first output terminals to one end of the switching circuit, a second output line electrically connecting the other one of the two first output terminals to another end of the switching circuit, a first input line electrically connecting one of the two input terminals to a connection node between the second switching element and the third switching element, and a second input line electrically connecting the other one of the two input terminals to the one of the two first output terminals. The reactor is arranged in at least one of the first input line and the second input line. The power conversion device includes a second converter configured to perform power conversion on a voltage across the flying capacitor as an input voltage, two second converter input terminals electrically connected to two ends of the flying capacitor, and two second output terminals configured to output power converted by the second converter. The second converter includes a primary-side circuit configured to convert power input via the two second converter input terminals into alternating-current power through switching operations of a second converter switching element and output the alternating-current power, and a secondary-side circuit configured to convert the alternating-current power into direct-current power and output the direct-current power to the two second output terminals. The second converter is an isolated DC/DC converter in which the primary-side circuit and the secondary-side circuit are electrically isolated from each other.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A power conversion device according to a first embodiment will now be described.

Figure 1:
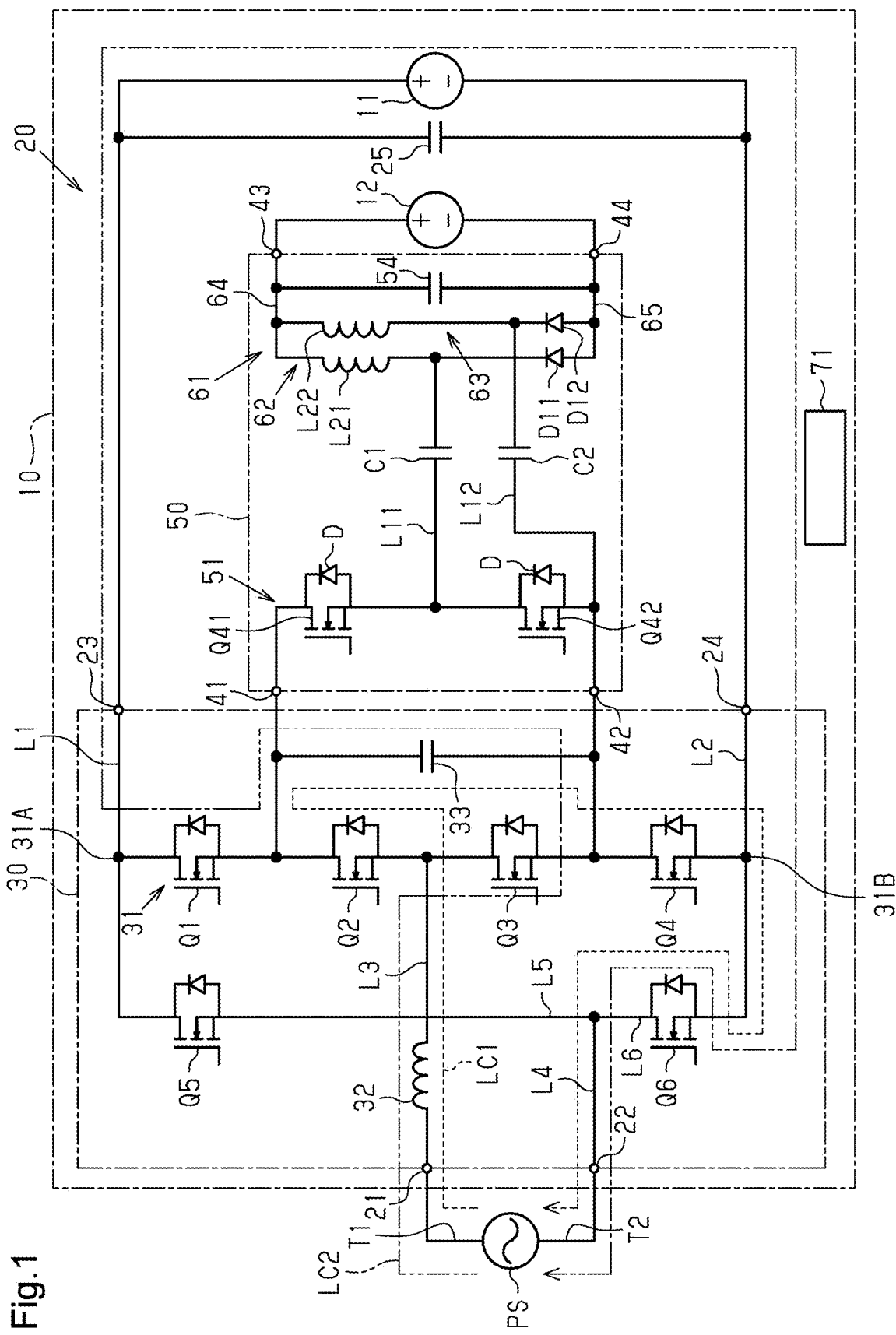
FIG. 1 is a circuit diagram of a power conversion device according to a first embodiment.

As shown in FIG. 1, a vehicle 10 includes a high-voltage battery 11, a low-voltage battery 12, and a power conversion device 20. The high-voltage battery 11 supplies power to, for example, the main driving source of the vehicle 10. The main driving source is, for example, a traction motor driving the vehicle 10. The low-voltage battery 12 supplies power to, for example, auxiliary devices of the vehicle 10. The auxiliary devices are electric components except the main driving source. The rated voltage of the high-voltage battery 11 is higher than the rated voltage of the low-voltage battery 12. Thus, charging the high-voltage battery 11 involves application of a higher voltage than when charging the low-voltage battery 12.

Power Conversion Device

The power conversion device 20 includes two input terminals 21, 22, a first converter 30, two first output terminals 23, 24, and a capacitor 25. The two input terminals 21, 22 are electrically connected to an external power supply PS. The external power supply PS is an alternating-current power supply. The external power supply PS includes a first terminal T1 and a second terminal T2. The external power supply PS alternately switches the polarity between the first terminal T1 and the second terminal T2 over time. The first terminal T1 of the external power supply PS is electrically connected to a first input terminal 21, which is one of the two input terminals 21, 22. The second terminal T2 of the external power supply PS is electrically connected to a second input terminal 22, which is the other one of the two input terminals 21, 22. The power conversion device 20 charges the high-voltage battery 11 and the low-voltage battery 12 by converting power supplied from the external power supply PS electrically connected to the input terminals 21, 22.

The first converter 30 converts power input from the external power supply PS via the input terminals 21, 22. The first converter 30 is a flying capacitor converter. The first converter 30 includes a switching circuit 31, a reactor 32, a flying capacitor 33, a first output line L1, and a second output line L2.

The switching circuit 31 includes a first switching element Q1, a second switching element Q2, a third switching element Q3, and a fourth switching element Q4. The switching circuit 31 is configured by connecting the first switching element Q1, the second switching element Q2, the third switching element Q3, and the fourth switching element Q4 in series to each other in this order. The switching elements Q1 to Q4 are, for example, metal oxide semiconductor field effect transistors (MOSFETs). The switching elements Q1 to Q4 may be insulated gate bipolar transistors (IGBTs) or gallium nitride high electron mobility transistors (GaN-HEMTs).

The flying capacitor 33 electrically connects a connection node between the first switching element Q1 and the second switching element Q2 to a connection node between the third switching element Q3 and the fourth switching element Q4.

The two first output terminals 23, 24 are electrically connected to the switching circuit 31. The first output line L1 electrically connects the first output terminal 23, which is one of the two first output terminals 23, 24, to one end 31A of the switching circuit 31. The second output line L2 electrically connects the first output terminal 24, which is the other one of the two first output terminals 23, 24, to the other end 31B of the switching circuit 31. The first switching element Q1 is connected to the first output terminal 23 via the first output line L1. The fourth switching element Q4 is connected to the first output terminal 24 via the second output line L2.

The first converter 30 includes a fifth switching element Q5, a sixth switching element Q6, a first input line L3, a second input line L4, a positive line L5, and a negative line L6. The fifth switching element Q5 and the sixth switching element Q6 are connected in series to each other. The fifth switching element Q5 and the sixth switching element Q6 are, for example, MOSFETs. The fifth switching element Q5 and the sixth switching element Q6 may be IGBTs or GaN-HEMTs.

The first input line L3 electrically connects the first input terminal 21 to a connection node between the second switching element Q2 and the third switching element Q3. The reactor 32 is arranged in the first input line L3.

The second input line L4 electrically connects the second input terminal 22 to one of the two first output terminals 23, 24. Whether the second input line L4 is electrically connected to the first output terminal 23 or the first output terminal 24 is switched in accordance with whether the first terminal T1 is positive or the second terminal T2 is positive.

The positive line L5 electrically connects the second input line L4 to the first output line L1. Thus, the second input line L4 is electrically connected to the first output terminal 23 via the positive line L5 and the first output line L1.

The negative line L6 electrically connects the second input line L4 to the second output line L2. Thus, the second input line L4 is electrically connected to the first output terminal 24 via the negative line L6 and the second output line L2.

The fifth switching element Q5 is arranged in the positive line L5. The sixth switching element Q6 is arranged in the negative line L6. When the switching elements Q5, Q6 are MOSFETs, the switching elements Q5, Q6 are arranged such that the forward directions of the parasitic diodes are directed from the second output line L2 to the first output line L1. In other words, the anode terminal of the parasitic diode of the switching element Q6 is electrically connected to the second output line L2, and the cathode terminal of the parasitic diode of the switching element Q5 is electrically connected to the first output line L1.

The first output terminal 23 is electrically connected to the positive electrode of the high-voltage battery 11. The first output terminal 24 is electrically connected to the negative electrode of the high-voltage battery 11. In the first converter 30, alternating-current power supplied from the external power supply PS is converted into direct-current power through switching operations of the first to fourth switching elements Q1 to Q4, and the direct-current power is output from the first output terminals 23, 24. The direct-current power output from the first output terminals 23, 24 is applied to the high-voltage battery 11. This charges the high-voltage battery 11. The first converter 30 steps up the voltage of alternating-current power and outputs the increased voltage. The first converter 30 may step down the voltage of the alternating-current power and output the stepped-down voltage.

The capacitor 25 is arranged between the first converter 30 and the high-voltage battery 11.

The power conversion device 20 includes two second converter input terminals 41, 42, a second converter 50, and two second output terminals 43, 44.

The two second converter input terminals 41, 42 are electrically connected to two ends of the flying capacitor 33. The second converter input terminal 41 is electrically connected to one end of the flying capacitor 33, and the second converter input terminal 42 is electrically connected to the other end of the flying capacitor 33.

Figure 3:
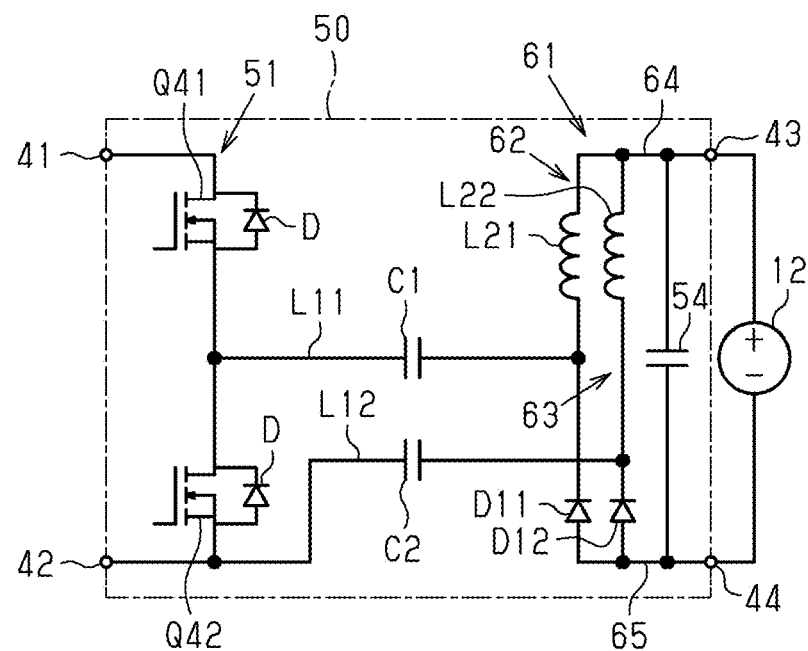
FIG. 3 is a circuit diagram of a second converter included in the power conversion device of FIG. 1.

As shown in FIG. 3, the second converter 50 includes a primary-side circuit 51, a first connection line L11, a second connection line L12, a first capacitor C1, a second capacitor C2, a secondary-side circuit 61, and a capacitor 54.

The primary-side circuit 51 includes an upper-arm switching element Q41 and a lower-arm switching element Q42. The upper-arm switching element Q41 and the lower-arm switching element Q42 each include a freewheeling diode D. The primary-side circuit 51 is a half-bridge circuit of the switching elements Q41, Q42. The upper-arm switching element Q41 and the lower-arm switching element Q42 are connected in series to each other. The upper-arm switching element Q41 is electrically connected to the second converter input terminal 41. The lower-arm switching element Q42 is electrically connected to the second converter input terminal 42. The switching elements Q41, Q42 are, for example, MOSFETs. The switching elements Q41, Q42 may be IGBTs or GaN-HEMTs.

The secondary-side circuit 61 includes a first leg 62, a second leg 63, a wire 64, and a wire 65. The first leg 62 includes a first coil L21 and a first diode D11 connected in series to each other. The second leg 63 includes a second coil L22 and a second diode D12 connected in series to each other. The secondary-side circuit 61 is electrically connected to the second output terminals 43, 44. The wire 64 connects the first coil L21 and the second coil L22 to the second output terminal 43, which is one of the two second output terminals 43, 44. The wire 65 connects the first diode D11 and the second diode D12 to the second output terminal 44, which is the other one of the two second output terminals 43, 44. The wire 64 is an example of a first wire. The wire 65 is an example of a second wire.

The anode terminals of the first diode D11 and the second diode D12 are electrically connected to the negative one of the second output terminals 43, 44. The cathode terminal of the first diode D11 is electrically connected to the first coil L21. The cathode terminal of the second diode D12 is electrically connected to the second coil L22. Thus, the cathode terminals of the first diode D11 and the second diode D12 are electrically connected to the positive one of the second output terminals 43, 44 via the coils L21, L22. In one example, the anode terminals of the first diode D11 and the second diode D12 are electrically connected to the second output terminal 44, and the cathode terminals of the first diode D11 and the second diode D12 are electrically connected to the second output terminal 43. The second converter 50 is a series resonant circuit.

The first connection line L11 and the second connection line L12 each include a first terminal and a second terminal. The first terminals of the first connection line L11 and the second connection line L12 are electrically connected to the primary-side circuit 51. The first terminal of the first connection line L11 is connected to a connection node between the upper-arm switching element Q41 and the lower-arm switching element Q42. The first terminal of the second connection line L12 is connected to the lower-arm switching element Q42.

The second terminals of the first connection line L11 and the second connection line L12 are electrically connected to the secondary-side circuit 61. The second terminal of the first connection line L11 is connected to a connection node between the first coil L21 and the first diode D11. The second terminal of the second connection line L12 is connected to a connection node between the second coil L22 and the second diode D12. Thus, the primary-side circuit 51 and the secondary-side circuit 61 are electrically connected by the first connection line L11 and the second connection line L12.

The first capacitor C1 is arranged in the first connection line L11. The second capacitor C2 is arranged in the second connection line L12. In the second converter 50, the primary-side circuit 51 and the secondary-side circuit 61 are isolated from each other by the first capacitor C1 and the second capacitor C2. The second converter 50 is an isolated DC/DC converter in which the primary-side circuit 51 and the secondary-side circuit 61 are electrically isolated from each other. The second converter 50 of the present embodiment is a capacitor-isolated converter in which the primary-side circuit 51 and the secondary-side circuit 61 are isolated from each other by the first capacitor C1 and the second capacitor C2.

The second output terminals 43, 44 are electrically connected to the low-voltage battery 12. The second output terminal 43 is connected to the positive electrode of the low-voltage battery 12. The second output terminal 44 is connected to the negative electrode of the low-voltage battery 12. Thus, of the second output terminals 43, 44, the second output terminal 43 is a positive one, and the second output terminal 44 is a negative one.

The capacitor 54 is arranged between the secondary-side circuit 61 and the low-voltage battery 12.

In the second converter 50, the primary-side circuit 51 receives the voltage across the flying capacitor 33 as an input voltage. The primary-side circuit 51 converts power input via the two second converter input terminals 41, 42 into alternating-current power through switching operations of the switching elements Q41, Q42. Thus, the alternating-current power is transmitted to the secondary-side circuit 61 via the first connection line L11 and the second connection line L12. The secondary-side circuit 61 converts the alternating-current power input from the first connection line L11 and the second connection line L12 into direct-current power and outputs the direct-current power to the second output terminals 43, 44. The switching elements Q41, Q42 are examples of second converter switching elements.

The power conversion device 20 includes a controller 71. The controller 71 includes a processor and a storage unit. The processor is, for example, a central processing unit (CPU), a graphics processing unit (GPU), or a digital signal processor (DSP). The storage unit includes random-access memory (RAM) and read-only memory (ROM). The storage unit stores program codes or instructions configured to cause the processor to execute processes. The storage unit, which is a computer-readable medium, includes any type of medium that is accessible by a general-purpose computer or a dedicated computer. The controller 71 may be configured by a hardware circuit such as an application specific integrated circuit (ASIC) or a field programmable gate array (FPGA). The controller 71, which is processing circuitry, may include one or more processors that operate according to a computer program, one or more hardware circuits such as an ASIC or an FPGA, or a combination thereof.

Control Performed by Controller

The controller 71 controls the voltage of direct-current power output from the first converter 30 to the first output terminals 23, 24 by controlling the switching elements Q1 to Q6, and controls the voltage across the flying-capacitor 33.

When power is supplied from the external power supply PS to the high-voltage battery 11 and the low-voltage battery 12, the controller 71 alternately switches the switching pattern of the switching elements Q1 to Q4 between a first pattern and a second pattern. The first pattern is a switching pattern in which the first switching element Q1 is switched off, the second switching element Q2 is switched on, the third switching element Q3 is switched off, and the fourth switching element Q4 is switched on. The second pattern is a switching pattern in which the first switching element Q1 is switched on, the second switching element Q2 is switched off, the third switching element Q3 is switched on, and the fourth switching element Q4 is switched off.

When the first terminal T1 of the external power supply PS is positive, the controller 71 switches off the fifth switching element Q5 and switches on the sixth switching element Q6. In this case, current is allowed to flow from the sixth switching element Q6 to the second input line L4, and current is not allowed to flow from flowing from the second input line L4 to the fifth switching element Q5. The current flows from the sixth switching element Q6 to the second input line L4.

When the second terminal T2 of the external power supply PS is positive, the controller 71 switches on the fifth switching element Q5 and switches off the sixth switching element Q6. In this case, current is allowed to flow from the second input line L4 to the fifth switching element Q5, and current is not allowed to flow from the second input line L4 to the sixth switching element Q6. The current flows from the second input line L4 to the fifth switching element Q5. The fifth switching element Q5 is an example of a first element. In the present embodiment, the first element is a switching element. The sixth switching element Q6 is an example of a second element.

As indicated by the broken line LC1 of FIG. 1, when the first terminal T1 of the external power supply PS is positive and the switching pattern is the first pattern, current flows in the order of the first terminal T1 of the external power supply PS, the reactor 32, the second switching element Q2, the flying capacitor 33, the fourth switching element Q4, the sixth switching element Q6, and the second terminal T2 of the external power supply PS. This charges the flying capacitor 33.

As indicated by the long-dash double-short-dash line LC2 of FIG. 1, when the first terminal T1 of the external power supply PS is positive and the switching pattern is the second pattern, current flows in the order of the first terminal T1 of the external power supply PS, the reactor 32, the third switching element Q3, the flying capacitor 33, the first switching element Q1, the high-voltage battery 11, the sixth switching element Q6, and the second terminal T2 of the external power supply PS. This discharges the flying capacitor 33.

Figure 2:
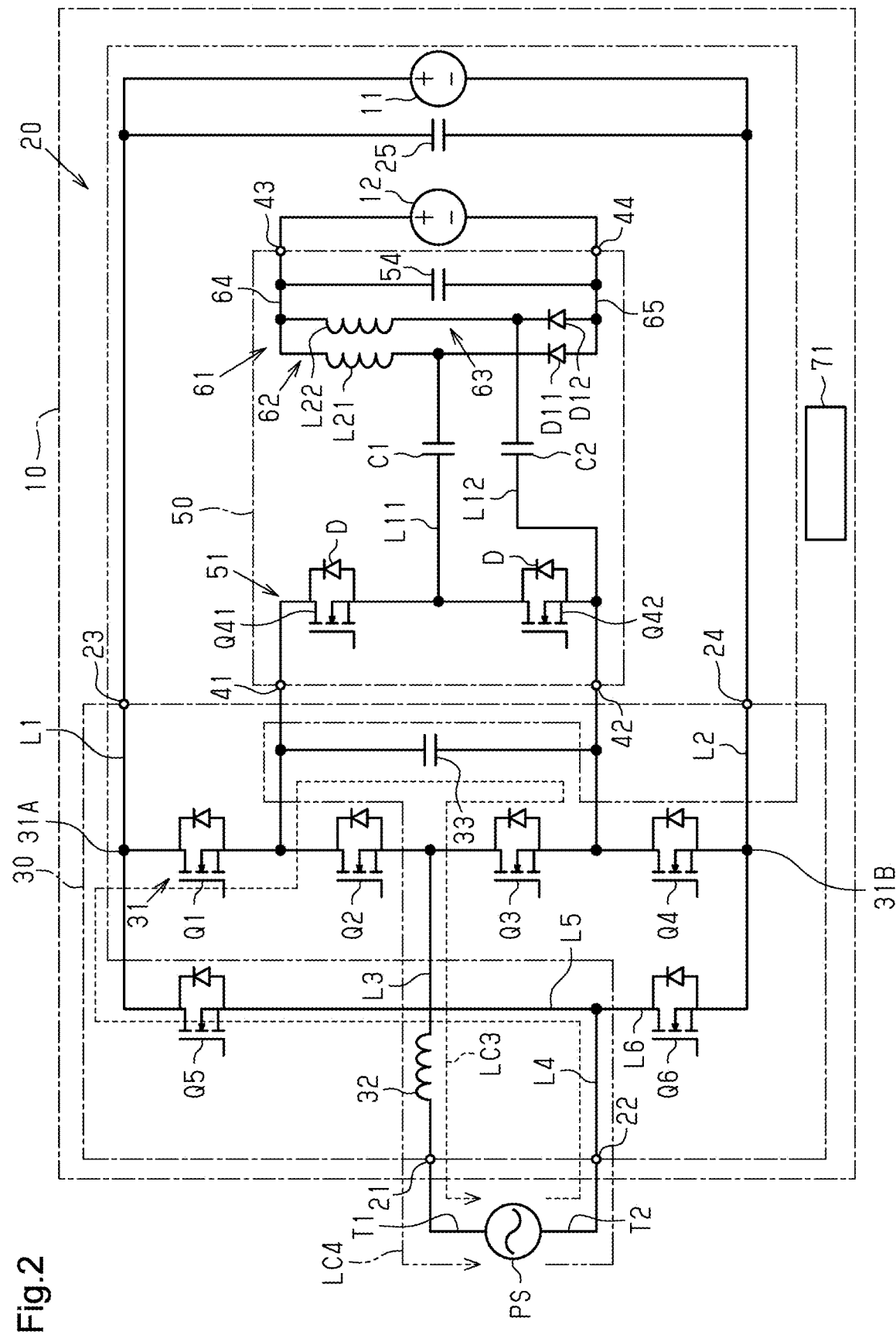
FIG. 2 is a circuit diagram of the power conversion device of the first embodiment.

As indicated by the broken line LC3 of FIG. 2, when the second terminal T2 of the external power supply PS is positive and the switching pattern is the second pattern, current flows in the order of the second terminal T2 of the external power supply PS, the fifth switching element Q5, the first switching element Q1, the flying capacitor 33, the third switching element Q3, the reactor 32, and the first terminal T1 of the external power supply PS. This charges the flying capacitor 33.

As indicated by the long-dash double-short-dash line LC4 of FIG. 2, when the second terminal T2 of the external power supply PS is positive and the switching pattern is the first pattern, current flows in the order of the second terminal T2 of the external power supply PS, the fifth switching element Q5, the high-voltage battery 11, the fourth switching element Q4, the flying capacitor 33, the second switching element Q2, the reactor 32, and the first terminal T1 of the external power supply PS. This discharges the flying capacitor 33.

The controller 71 controls the switching elements Q1 to Q6 such that an output voltage that is the voltage output from the first output terminals 23, 24 follows a target value and the voltage across the flying-capacitor 33 follows a target value. Thus, the controller 71 charges the high-voltage battery 11 by controlling the output voltage of the first output terminals 23, 24. The controller 71 controls the voltage across the flying capacitor 33.

The controller 71 controls the voltage of direct-current power output from the second converter 50 to the second output terminals 43, 44 by controlling the switching elements Q41, Q42. For example, the controller 71 alternately switches the switching pattern of the switching elements Q41, Q42 between a third pattern and a fourth pattern. The third pattern is a switching pattern in which the upper-arm switching element Q41 is switched on and the lower-arm switching element Q42 is switched off. The fourth pattern is a switching pattern in which the upper-arm switching element Q41 is switched off and the lower-arm switching element Q42 is switched on.

The controller 71 controls the switching elements Q41, Q42 such that an output voltage that is the voltage output from the second output terminals 43, 44 follows a target value. Thus, the controller 71 charges the low-voltage battery 12 by controlling the output voltage of the second output terminals 43, 44.

When power is supplied from the external power supply PS to the high-voltage battery 11, and not to the low-voltage battery 12, the controller 71 alternately switches the switching pattern of the switching elements Q1 to Q4 between the fifth pattern and the sixth pattern. The fifth pattern is a switching pattern in which the first switching element Q1 is switched off, the second switching element Q2 is switched off, the third switching element Q3 is switched on, and the fourth switching element Q4 is switched on. The sixth pattern is a switching pattern in which the first switching element Q1 is switched on, the second switching element Q2 is switched on, the third switching element Q3 is switched off, and the fourth switching element Q4 is switched off.

When the first terminal T1 of the external power supply PS is positive, the controller 71 switches off the fifth switching element Q5 and switches on the sixth switching element Q6. In this case, current is allowed to flow from the second output line L2 to the sixth switching element Q6, and current is not allowed to flow from the first output line L1 to the fifth switching element Q5. The current flows from the sixth switching element Q6 to the second input line L4.

When the second terminal T2 of the external power supply PS is positive, the controller 71 switches on the fifth switching element Q5 and switches off the sixth switching element Q6. In this case, current is allowed to flow from the second input line L4 to the fifth switching element Q5, and current is not allowed to flow from the second input line L4 to the sixth switching element Q6. The current flows from the second input line L4 to the fifth switching element Q5.

When the first terminal T1 of the external power supply PS is positive and the switching pattern is the fifth pattern, current flows in the order of the first terminal T1 of the external power supply PS, the reactor 32, the third switching element Q3, the fourth switching element Q4, the sixth switching element Q6, and the second terminal T2 of the external power supply PS.

When the first terminal T1 of the external power supply PS is positive and the switching pattern is the sixth pattern, current flows in the order of the first terminal T1 of the external power supply PS, the reactor 32, the second switching element Q2, the first switching element Q1, the high-voltage battery 11, and the sixth switching element Q6, the second terminal T2 of the external power supply PS.

When the second terminal T2 of the external power supply PS is positive and the switching pattern is the sixth pattern, current flows in the order of the second terminal T2 of the external power supply PS, the fifth switching element Q5, the first switching element Q1, the second switching element Q2, the reactor 32, and the first terminal T1 of the external power supply PS.

When the second terminal T2 of the external power supply PS is positive and the switching pattern is the fifth pattern, current flows in the order of the second terminal T2 of the external power supply PS, the fifth switching element Q5, the high-voltage battery 11, the fourth switching element Q4, the third switching element Q3, the reactor 32, and the first terminal T1 of the external power supply PS.

The controller 71 controls the switching elements Q1 to Q6 such that the output voltage of the first output terminals 23, 24 follows a target value. Thus, the controller 71 charges the high-voltage battery 11 by controlling the output voltage of the first output terminals 23, 24.

Operation of First Embodiment

The power conversion device 20 includes the first converter 30 and the second converter 50. The first converter 30 transforms voltage input from the external power supply PS and outputs the transformed voltage. The second converter 50 transforms the voltage across the flying capacitor 33, which is the input voltage, and outputs the transformed voltage. Thus, the power conversion device 20 outputs different output voltages. With the power conversion device 20 mounted on the vehicle 10 in the present embodiment, the first converter 30 charges the high-voltage battery 11, and the second converter 50 charges the low-voltage battery 12.

The controller 71 controls the switching elements Q1 to Q6 to charge the high-voltage battery 11 and control the voltage across the flying capacitor 33. Since the second converter 50 receives the voltage across the flying capacitor 33 as the input voltage, controlling the voltage across the flying capacitor 33 allows for controlling the input voltage of the second converter 50.

The first capacitor C1 and the second capacitor C2 allow alternating-current power to flow while blocking direct-current power. Thus, in the second converter 50, the first capacitor C1 and the second capacitor C2 isolate the primary-side circuit 51 and the secondary-side circuit 61 from each other.

When the first capacitor C1 and the second capacitor C2 isolate the primary-side circuit 51 and the secondary-side circuit 61, the transformation ratio may be less than when a transformer is used. This may not increase the difference between the voltage input from the external power supply PS and the output voltage of the second converter 50. For example, when a target value of the output voltage of the second converter 50 is 14 V and the voltage of the power supplied from the external power supply PS is several hundred V, the several hundred V needs to be stepped down to 14 V. It is difficult to step down the several hundred V to 14 V with the second converter 50 that does not include a transformer.

In contrast, with the power conversion device 20 of the present embodiment, the voltage across the flying capacitor 33 is used as the input voltage of the second converter 50. The first converter 30 controls the voltage across the flying capacitor 33 to control the input voltage of the second converter 50. By setting the voltage across the flying capacitor 33 to be lower than the voltage of power supplied from the external power supply PS, the second converter 50 will output a target value of the output voltage. For example, when the first converter 30 adjusts the voltage across the flying capacitor 33 to the same value as the target value of the output voltage of the second converter 50, the second converter 50 no longer needs to step down voltage. This controls the output voltage of the second converter 50 without a transformer.

Advantages of First Embodiment (1-1) The first converter 30 performs power conversion on power input from the external power supply PS. The second converter 50 performs power conversion on the voltage across the flying capacitor 33 as an input voltage. This outputs voltages of different values from the first output terminals 23, 24 and the second output terminals 43, 44. The power conversion device 20 supplies power to devices having different required voltages. In the embodiment, power is supplied to the high-voltage battery 11 and the low-voltage battery 12 to charge the high-voltage battery 11 and the low-voltage battery 12.

(1-2) In the second converter 50, the primary-side circuit 51 and the secondary-side circuit 61 are isolated from each other by the first capacitor C1 and the second capacitor C2. The capacitors are individually smaller than a transformer. This allows enlargement of the second converter 50 and the power conversion device 20 to be avoided compared to when the primary-side circuit 51 and the secondary-side circuit 61 are isolated from each other by a transformer.

Further, the first converter 30 controls the voltage across the flying capacitor 33 to control the input voltage of the second converter 50. This controls the output voltage of the second converter 50.

(1-3) The external power supply PS is an alternating-current power supply. The power conversion device 20 includes the fifth switching element Q5 and the sixth switching element Q6. The fifth switching element Q5 and the sixth switching element Q6 are configured such that current flows from the sixth switching element Q6 to the second input line L4 when the first terminal T1 of the external power supply PS is positive, and that current flows from the second input line L4 to the fifth switching element Q5 when the second terminal T2 of the external power supply PS is positive. This allows for power conversion even when the external power supply PS is an alternating-current power supply.

(1-4) The power conversion device 20 is mounted on the vehicle 10. The vehicle 10 includes the high-voltage battery 11 driving the main driving source and the low-voltage battery 12 driving auxiliary devices. Thus, the power conversion device 20 is to output voltage for charging the high-voltage battery 11 and voltage for charging the low-voltage battery 12. The power conversion device 20 outputs voltage for charging the high-voltage battery 11 from the first output terminals 23, 24 and voltage for charging the low-voltage battery 12 from the second output terminals 43, 44. This allows the single power conversion device 20 to charge the high-voltage battery 11 and the low-voltage battery 12.

Second Embodiment

The power conversion device according to a second embodiment will now be described.

Figure 4:
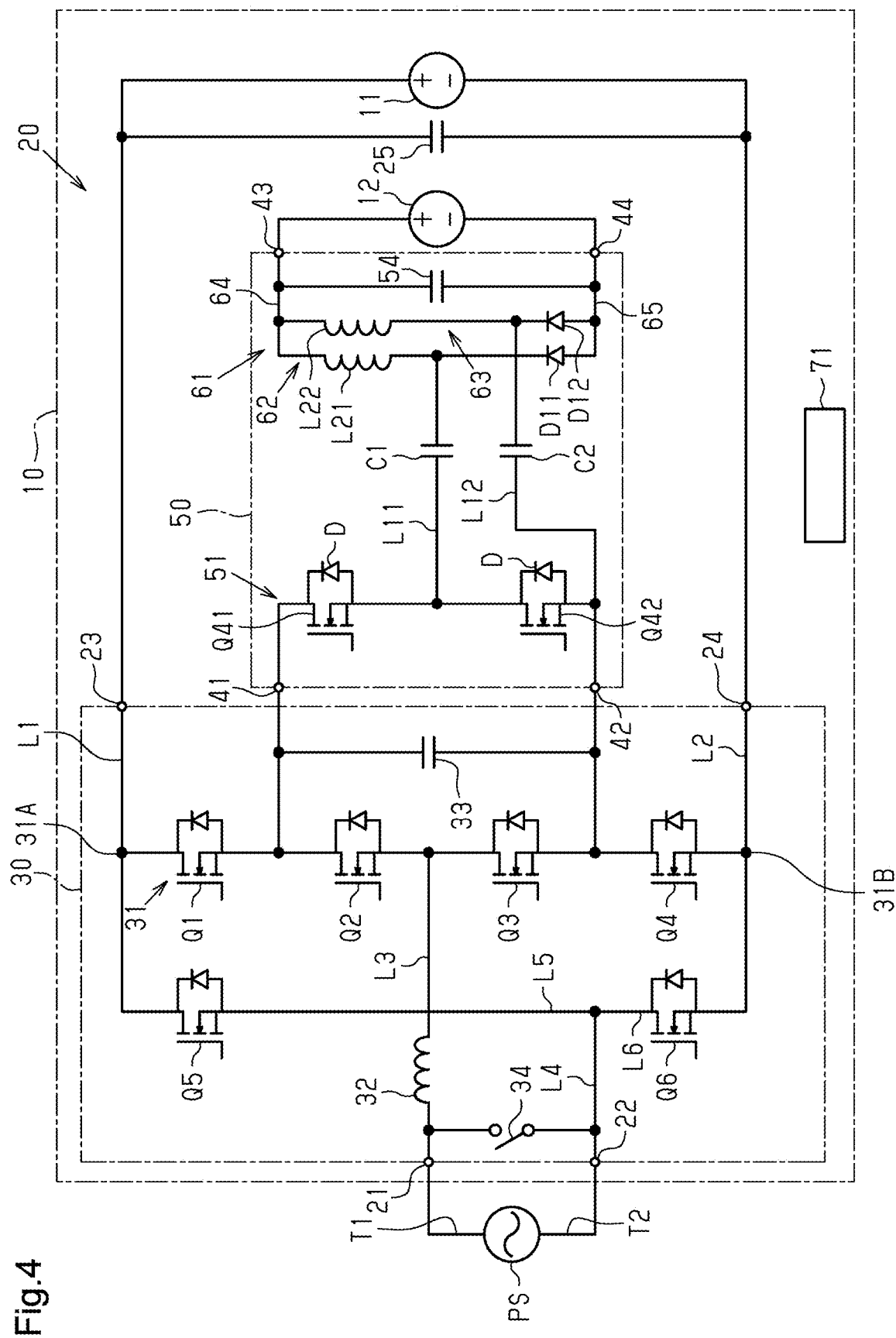
FIG. 4 is a circuit diagram of the power conversion device according to a second embodiment.

As shown in FIG. 4, the power conversion device 20 of the second embodiment includes a switch 34 in addition to the configuration of the power conversion device 20 of the first embodiment. The switch 34 is closed to connect the first input terminal 21 and the second input terminal 22.

The power conversion device 20 of the second embodiment charges the low-voltage battery 12 by supplying power from the high-voltage battery 11 to the low-voltage battery 12 in addition to the operations disclosed in the first embodiment. The switch 34 is closed when the high-voltage battery 11 charges the low-voltage battery 12. The switch 34 is open when the external power supply PS charges the high-voltage battery 11 and the low-voltage battery 12.

The control performed by the controller 71 when the high-voltage battery 11 charges the low-voltage battery 12 will now be described.

The controller 71 maintains the first switching element Q1 and the third switching element Q3 switched off. The controller 71 maintains the second switching element Q2 and the fourth switching element Q4 switched on. In this state, the controller 71 steps down the voltage input from the high-voltage battery 11 by operating the fifth switching element Q5 and the sixth switching element Q6 in chopper mode. By alternately switching on the fifth switching element Q5 and the sixth switching element Q6, the voltage input from the high-voltage battery 11 is stepped down and output to control the voltage across the flying capacitor 33.

The controller 71 alternately switches on the upper-arm switching elements Q41 and the lower-arm switching elements Q42. The controller controls the output voltage of the second converter 50 through the series resonance operation. This charges the low-voltage battery 12. The operation of the second converter 50 of the present embodiment will now be described in detail.

Figure 5:
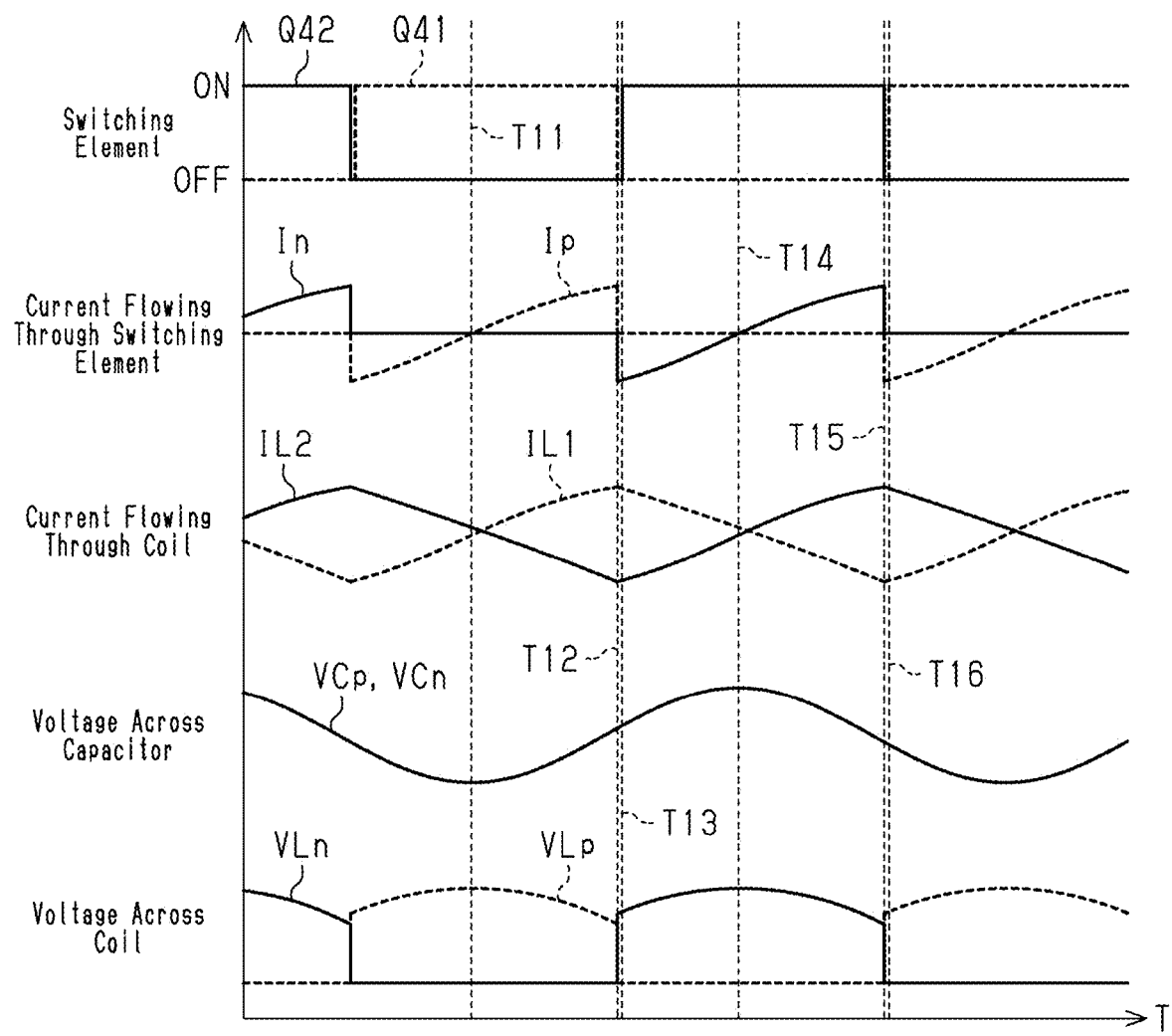
FIG. 5 is a time chart showing the relationship among the states of a fifth switching element and a sixth switching element, the currents flowing through the fifth switching element and the sixth switching element, the currents flowing through a first coil and a second coil, the voltage across a first capacitor and a second capacitor, and the voltage across the first coil and the second coil.

FIG. 5 shows ON and OFF of the upper-arm switching element Q41 and the lower-arm switching element Q42, a current Ip flowing through the upper-arm switching element Q41, a current In flowing through the lower-arm switching element Q42, a current IL1 flowing through the first coil L21, a current IL2 flowing through the second coil L22, a voltage VCp across the first capacitor C1, a voltage VCn across the second capacitor C2, a voltage VLp across the first coil L21, and a voltage VLn across the second coil L22. FIGS. 6 to 11 show a load current I1 and a no-load current I2. The load current I1 is current flowing through the low-voltage battery 12, which is a load. The no-load current I2 is current that does not flow through the low-voltage battery 12, which is a load.

Figure 6:
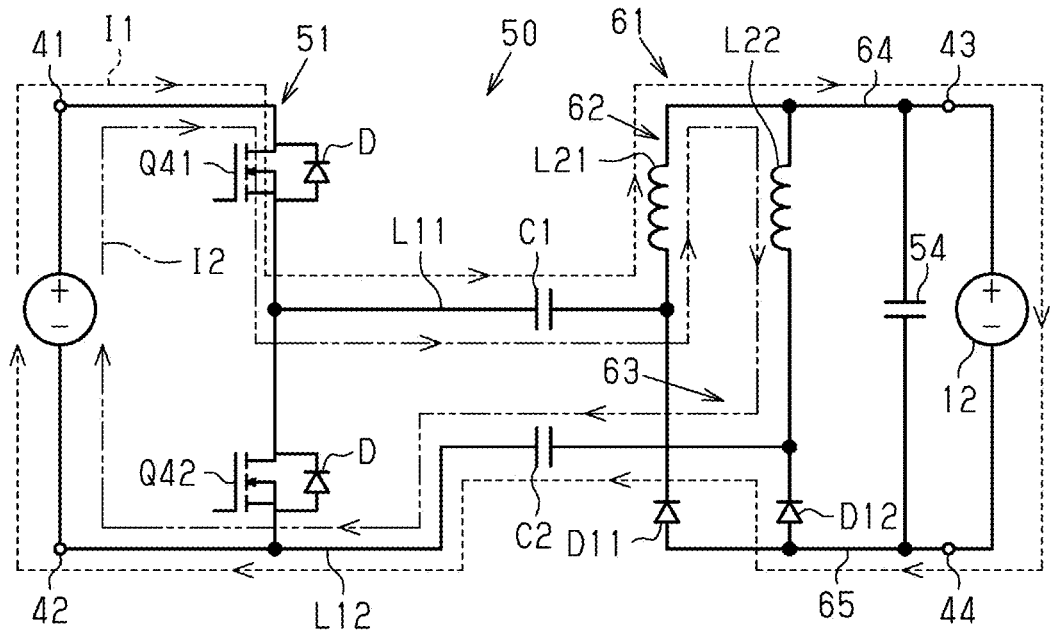
FIG. 6 is a diagram showing the load current and the no-load current flowing through the second converter of FIG. 4.

As shown in FIG. 5, at time T11, the upper-arm switching element Q41 is switched on, and the lower-arm switching element Q42 is switched off. As shown in FIG. 6, at time T11, the upper-arm switching element Q41 is switched on and the voltage across the capacitor 33, which is a direct-current power supply, is input to the second converter 50. The load current I1 flows through a path passing through the upper-arm switching element Q41, the first capacitor C1, the first coil L21, the low-voltage battery 12, the second diode D12, and the second capacitor C2. The no-load current I2 flows through a path passing through the upper-arm switching element Q41, the first capacitor C1, the first coil L21, the second coil L22, and the second capacitor C2. The first capacitor C1 and the second capacitor C2 are charged.

Figure 7:
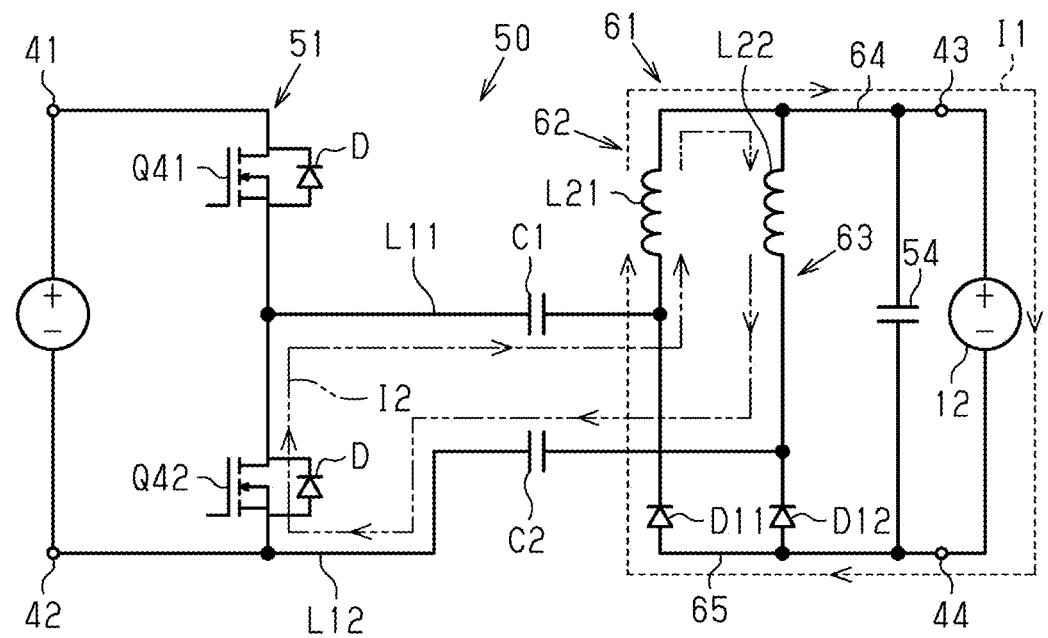
FIG. 7 is a diagram showing the load current and the no-load current flowing through the second converter of FIG. 4.

At time T12, the upper-arm switching element Q41 is switched off. Thus, the power is not supplied from the flying capacitor 33 to the second converter 50. The energy stored in the first coil L21 causes the load current I1 to flow. As shown in FIG. 7, the load current I1 flows through a path passing through the first coil L21, the low-voltage battery 12, and the first diode D11. The energy stored in the second coil L22 causes the no-load current I2 to flow. The no-load current I2 flows through a path passing through the second coil L22, the second capacitor C2, the freewheeling diode D of the lower-arm switching element Q42, the first capacitor C1, and the first coil L21. The no-load current I2 reversely conducts the lower-arm switching element Q42.

Figure 8:
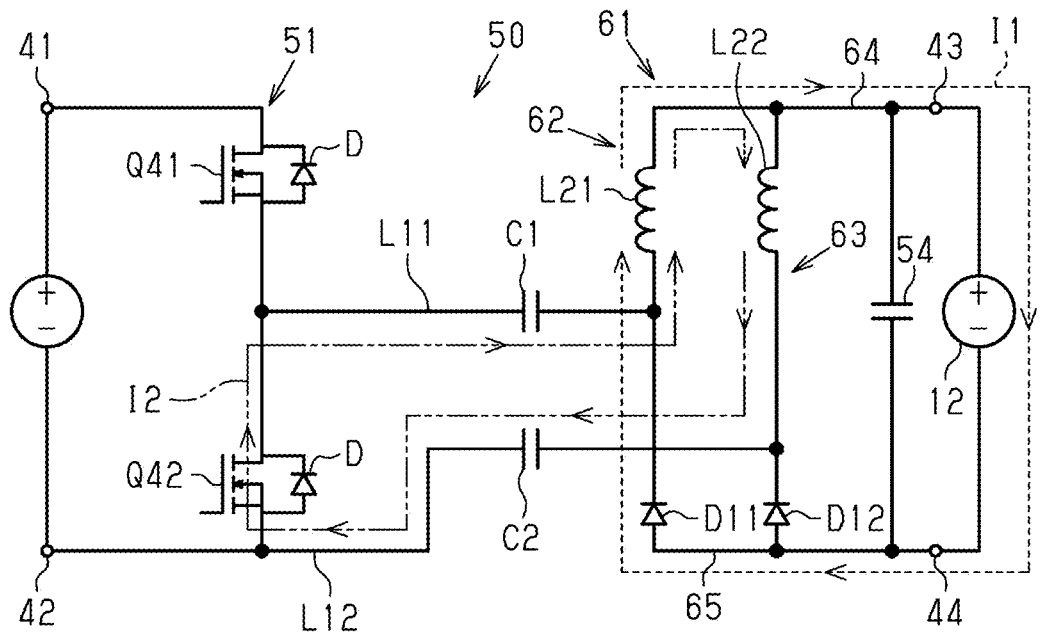
FIG. 8 is a diagram showing the load current and the no-load current flowing through the second converter of FIG. 4.
Figure 9:
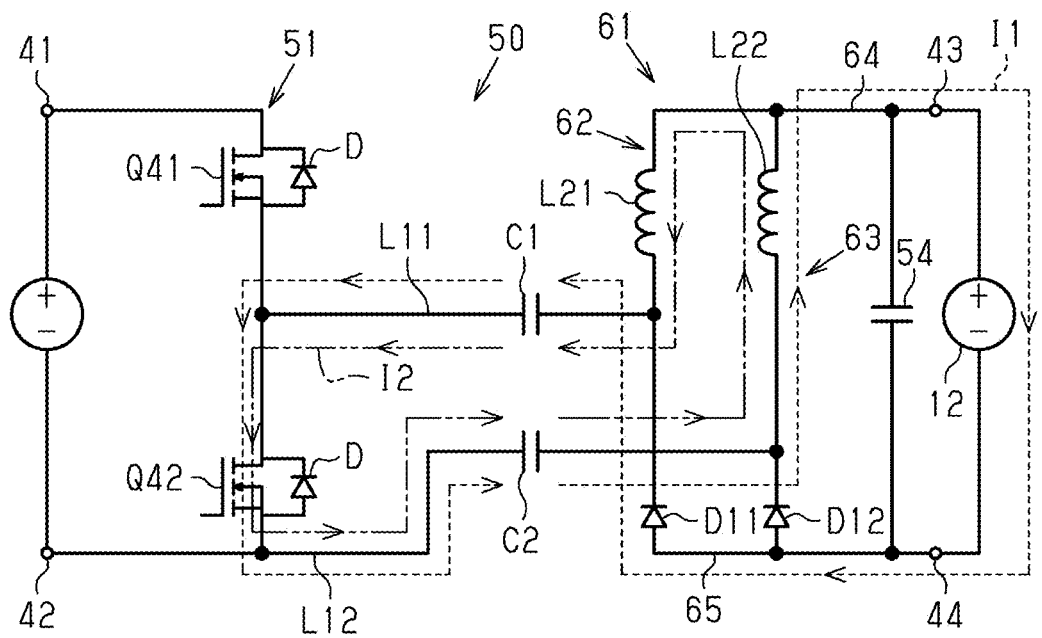
FIG. 9 is a diagram showing the load current and the no-load current flowing through the second converter of FIG. 4.

At time T13, the lower-arm switching element Q42 is switched on in a state in which the lower-arm switching element Q42 is in reverse conduction. Since the lower-arm switching element Q42 is in reverse conduction, the voltage across the lower-arm switching element Q42 is 0. This allows for zero voltage switching (ZVS). As shown in FIG. 8, the path through which the load current I1 flows is the same as it was at time T12. The no-load current I2 flows through a path passing through the second coil L22, the second capacitor C2, the lower-arm switching element Q42, the first capacitor C1, and the first coil L21. As time elapses from time T13, the output current from the first coil L21 and the second coil L22 decreases. At time T14, the first capacitor C1 and the second capacitor C2 start to discharge. This changes the current polarity of the no-load current I2. As shown in FIG. 9, the load current I1 flows through a path passing through the first capacitor C1, the lower-arm switching element Q42, the second capacitor C2, the second coil L22, the low-voltage battery 12, and the first diode D11. The voltages of the first capacitor C1 and the second capacitor C2 decrease during the discharge. Energy is stored in the first coil L21 and the second coil L22.

Figure 10:
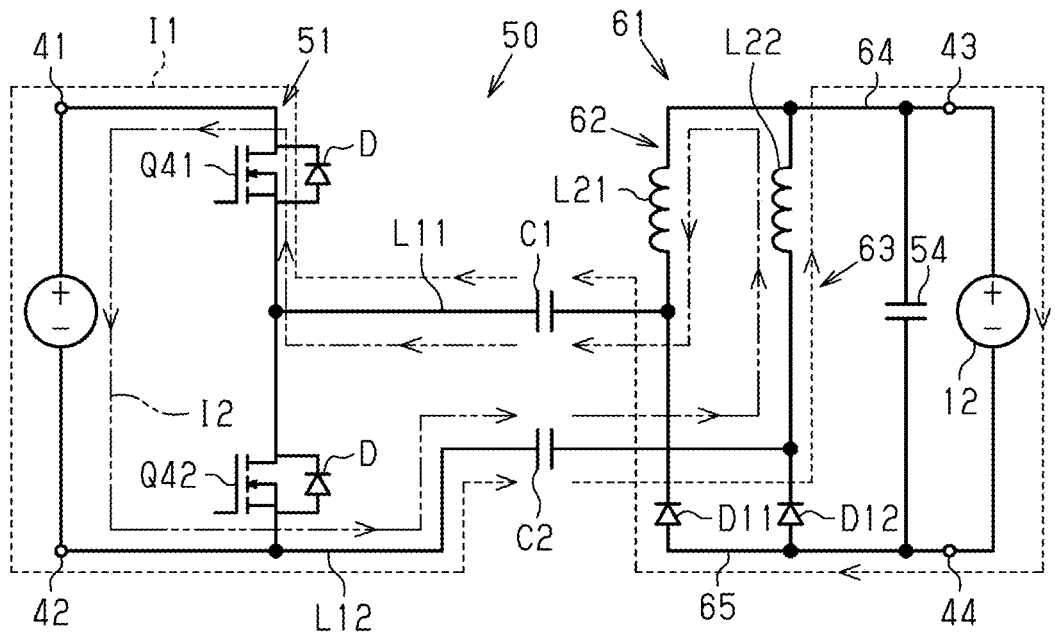
FIG. 10 is a diagram showing the load current and the no-load current flowing through the second converter of FIG. 4.

At time T15, the lower-arm switching element Q42 is switched off. As shown in FIG. 10, the load current I1 flows through a path passing through the first capacitor C1, the freewheeling diode D of the upper-arm switching element Q41, the second capacitor C2, the second coil L22, the low-voltage battery 12, and the first diode D11. The no-load current I2 flows through a path passing through the second capacitor C2, the second coil L22, the first coil L21, the first capacitor C1, and the freewheeling diode D of the upper-arm switching element Q41. The load current I1 and the no-load current I2 reversely conduct the upper-arm switching element Q41.

Figure 11:
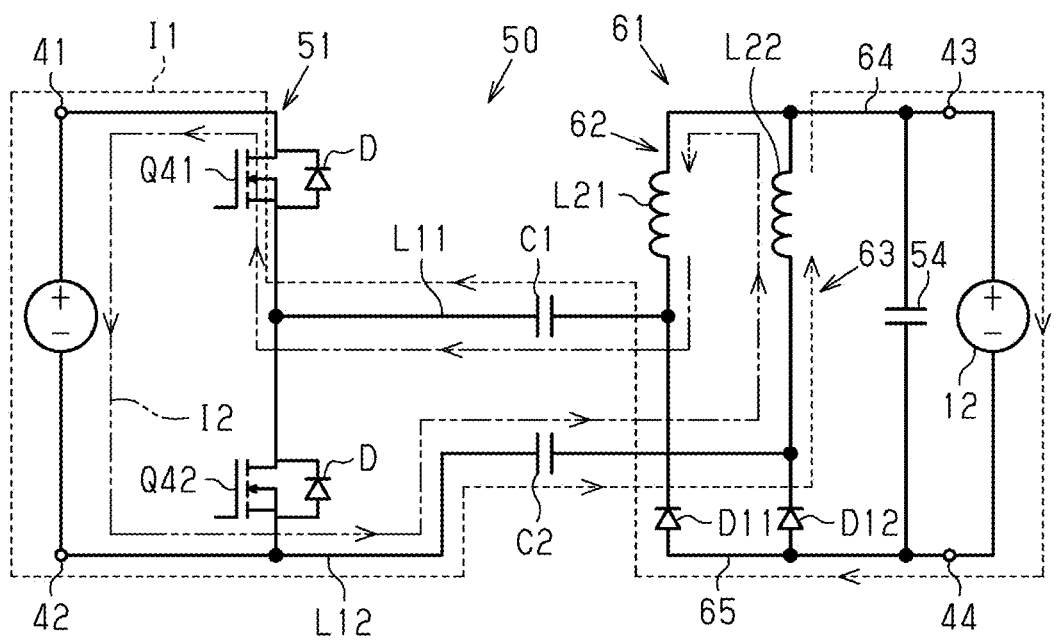
FIG. 11 is a diagram showing the load current and the no-load current flowing through the second converter of FIG. 4.

At time T16, the upper-arm switching element Q41 is switched on. Since the upper-arm switching element Q41 is in reverse conduction, the voltage across the upper-arm switching element Q41 is 0. This allows for ZVS. As shown in FIG. 11, the paths of the load current I1 and the no-load current I2 are changed from the freewheeling diode D of the upper-arm switching element Q41 to the upper-arm switching element Q41.

Operation of Second Embodiment

The power conversion device 20 includes the switch 34. The voltage of the high-voltage battery 11 is stepped down and input to the second converter 50 by closing the switch 34 and controlling the first to sixth switching elements Q1 to Q6. The second converter 50 steps down the input voltage and outputs the stepped-down voltage. This charges the low-voltage battery 12.

The second converter 50 of the present embodiment is a capacitor-isolated converter in which the primary-side circuit 51 and the secondary-side circuit 61 are isolated from each other by the first capacitor C1 and the second capacitor C2. Since the capacitor-isolated converter does not include a transformer, it is difficult to step down an input voltage. In particular, stepping down the input voltage can be challenging under a light load. When a half-bridge circuit is used for the primary-side circuit 51 as in the present embodiment, the voltage can only be stepped down to half of the input voltage. Thus, the voltage across the flying capacitor 33 needs to be decreased in accordance with the output voltage of the second converter 50. For example, when a target value of the output voltage of the second converter 50 is 15 V and the second converter 50 can only step down the voltage to half of the input voltage, the voltage across the flying capacitor 33, which is the input voltage of the second converter 50, needs to be adjusted to 30 V. As the voltage across the flying capacitor 33 becomes lower, the current becomes greater. The current from the high-voltage battery 11 is supplied through the second switching element Q2, the fourth switching element Q4, the fifth switching element Q5, and the sixth switching element Q6. As the voltage across the flying capacitor 33 is decreased, the current flowing through the switching elements Q2, Q4, Q5, and Q6 increases. As a result, the current rating for the switching elements Q2, Q4, Q5, and Q6 may increase.

In the present embodiment, the secondary-side circuit 61 includes the leg 62 in which the first coil L21 and the first diode D11 are connected in series, and the leg 63 in which the second coil L22 and the second diode D12 are connected in series. In the secondary-side circuit 61, the coils L21, L22 of the legs 62, 63 each have an output current. The sum of the output currents from the two coils L21, L22 is the total output current. This will increase the current input to the secondary-side circuit 61. As a result, the voltage can be stepped down with the secondary-side circuit 61, and the voltage of the flying capacitor 33 can be increased accordingly.

Advantages of Second Embodiment (2-1) The power conversion device 20 includes the switch 34. This allows for charging the low-voltage battery 12 from the high-voltage battery 11.

(2-2) The secondary-side circuit 61 includes the legs 62, 63. This allows for increasing the output current of the secondary-side circuit 61. The output voltage of the secondary-side circuit 61 decreases by increasing the output current of the secondary-side circuit 61. As a result, the step-down ratio of the second converter 50 is increased. Even when the voltage across the flying capacitor 33 is increased, an output voltage required for the second converter 50 is output. Thus, an increase in the current flowing through the switching elements Q2, Q4, Q5, and Q6 is avoided by decreasing the voltage across the flying capacitor 33.

Modifications

The above-described embodiments may be modified as follows. The present embodiment and the following modifications can be combined as long as the combined modifications remain technically consistent with each other.

Figure 12:
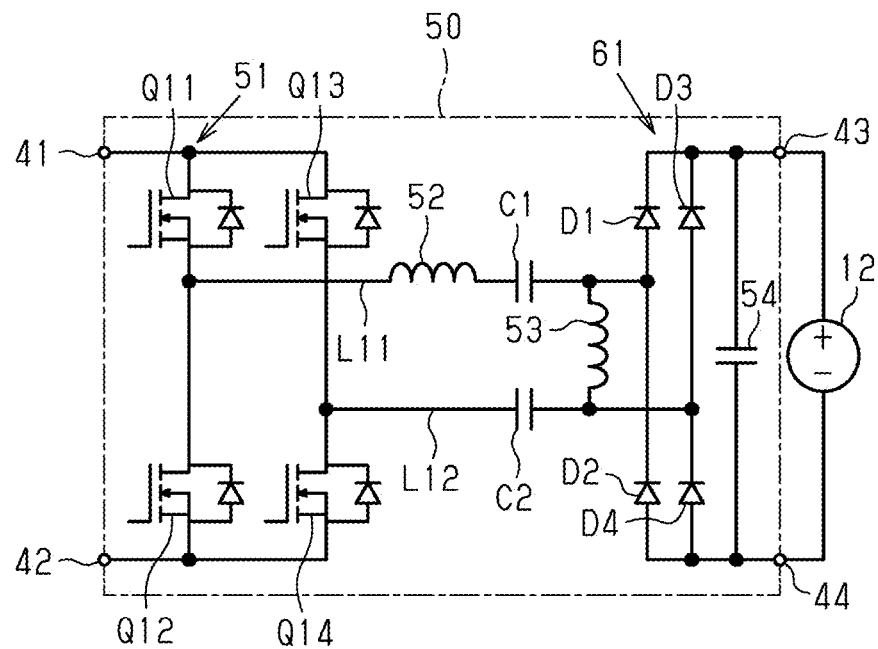
FIG. 12 is a diagram showing a modification of the second converter.

In the first embodiment, the second converter 50 may have a configuration shown in FIG. 12. The second converter 50 shown in FIG. 12 is an LLC converter. The second converter 50 includes the primary-side circuit 51, the first connection line L11, the second connection line L12, the first capacitor C1, the second capacitor C2, the secondary-side circuit 61, inductors 52, 53, and the capacitor 54.

The primary-side circuit 51 includes a first upper-arm switching element Q11, a first lower-arm switching element Q12, a second upper-arm switching element Q13, and a second lower-arm switching element Q14. The primary-side circuit 51 is a full-bridge circuit of the switching elements Q11 to Q14. The first upper-arm switching element Q11 and the first lower-arm switching element Q12 are connected in series to each other. The second upper-arm switching element Q13 and the second lower-arm switching element Q14 are connected in series to each other. The upper-arm switching elements Q11, Q13 are electrically connected to the second converter input terminal 41. The lower-arm switching elements Q12, Q14 are electrically connected to the second converter input terminal 42. The switching elements Q11 to Q14 are, for example, MOSFETs. The switching elements Q11 to Q14 may be IGBTs or GaN-HEMTs. The switching elements Q11 to Q14 are examples of the second converter switching elements.

The secondary-side circuit 61 includes four diodes D1 to D4. The secondary-side circuit 61 is a full-bridge circuit of the diodes D1 to D4. The diode D1 and the diode D2 are connected in series to each other in the forward direction. The diode D3 and the diode D4 are connected in series to each other in the forward direction.

The inductor 52 is arranged in the first connection line L11. The inductor 52 is arranged between the first capacitor C1 and the primary-side circuit 51. The inductor 53 connects the first connection line L11 and the second connection line L12. The inductor 53 is arranged between the secondary-side circuit 61 and a group of the first and second capacitors C1, C2.

The secondary-side circuit 61 is electrically connected to the second output terminals 43, 44. The diodes D1, D3 are connected to the second output terminal 43. The diodes D2, D4 are connected to the second output terminal 44.

The first connection line L11 connects a connection node between the first upper-arm switching element Q11 and the first lower-arm switching element Q12 to a connection node between the diode D1 and the diode D2. The second connection line L12 connects a connection node between the second upper-arm switching element Q13 and the second lower-arm switching element Q14 to a connection node between the diode D3 and the diode D4.

In the LLC converter, soft switching of the switching elements Q11 to Q14 is performed through resonance using the first capacitor C1, the second capacitor C2, and the inductors 52, 53. This reduces power loss from switching operations of the switching elements Q11 to Q14.

Figure 13:
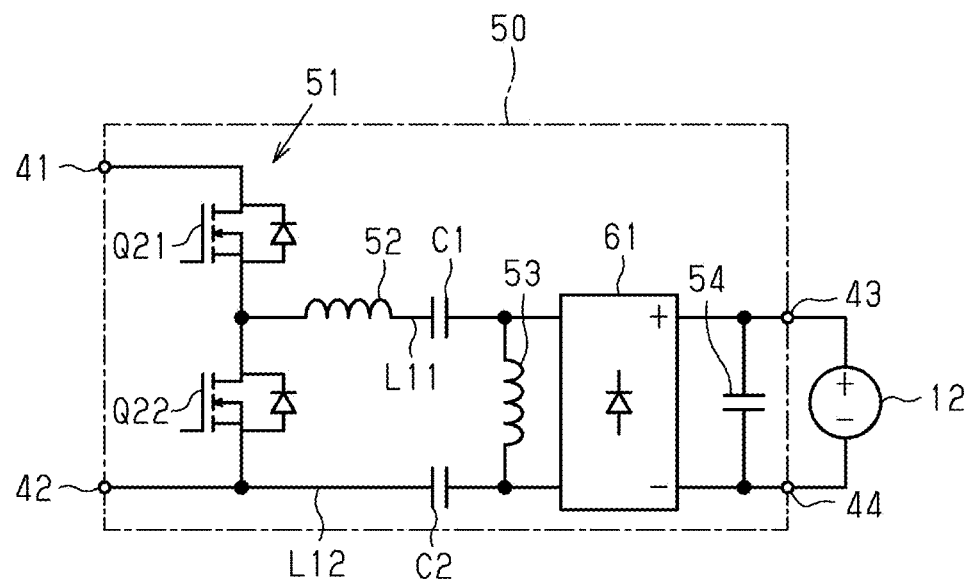
FIG. 13 is a diagram showing a modification of the second converter.

In the first embodiment, the primary-side circuit 51 of the second converter 50 may have a circuit configuration shown in FIG. 13. The primary-side circuit 51 includes two second converter switching elements Q21, Q22 connected in series to each other. The secondary-side circuit 61 is, for example, a full-bridge circuit of diodes. The first connection line L11 is connected to a connection node between the two second converter switching elements Q21, Q22. The second connection line L12 is connected to the second converter switching element Q22. The primary-side circuit 51 converts input power into alternating-current power through switching operations of the two second converter switching elements Q21, Q22. The secondary-side circuit 61 converts the alternating-current power into direct-current power. The second converter 50 shown in FIG. 13 has the same advantages as those achieved in the embodiment.

Figure 14:
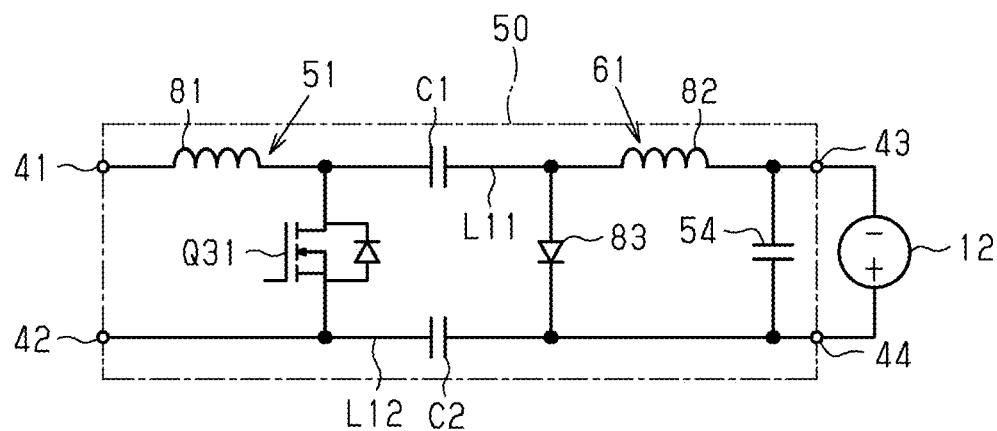
FIG. 14 is a diagram showing a modification of the second converter.

In the first embodiment, the second converter 50 may have a circuit configuration shown in FIG. 14. The circuit configuration shown in FIG. 14 is a Cuk converter. The primary-side circuit 51 includes a first inductor 81 electrically connected to the second converter input terminal 41, and a second converter switching element Q31 electrically connecting the two second converter input terminals 41, 42 to each other via the first inductor 81. The secondary-side circuit 61 includes a second inductor 82 electrically connected to the second output terminal 43, and a diode 83 electrically connecting the two second output terminals 43, 44 to each other via the second inductor 82. The anode terminal of the diode 83 is electrically connected to the second output terminal 43. The cathode terminal of the diode 83 is electrically connected to the second output terminal 44. The primary-side circuit 51 and the secondary-side circuit 61 are isolated from each other by the first capacitor C1 and the second capacitor C2. The second converter 50 shown in FIG. 14 has the same advantages as those achieved in the embodiment.

Figure 15:
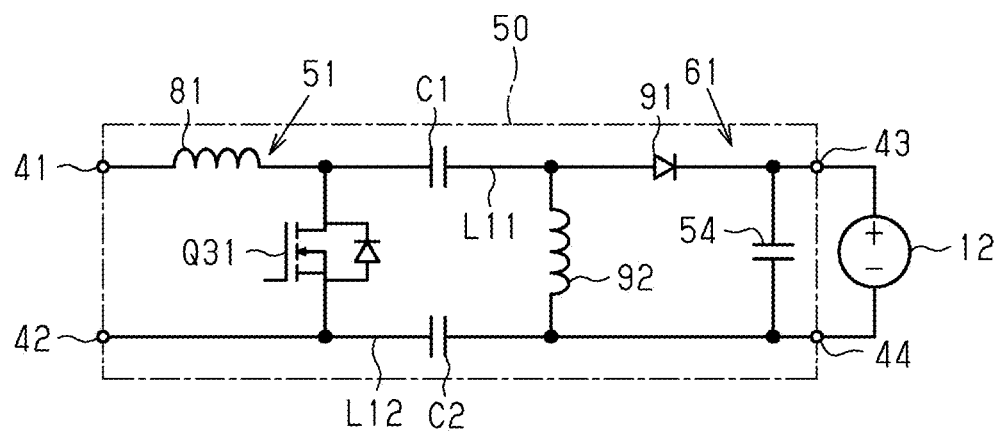
FIG. 15 is a diagram showing a modification of the second converter.

In the first embodiment, the second converter 50 may have a circuit configuration shown in FIG. 15. The circuit configuration shown in FIG. 15 is an SEPIC circuit. The primary-side circuit 51 has the same circuit configuration as that shown in FIG. 14. The secondary-side circuit 61 includes a diode 91 electrically connected to the second output terminal 43, and a second inductor 92 electrically connecting the two second output terminals 43, 44 to each other via the diode 91. The anode terminal of the diode 91 is electrically connected to the first capacitor C1. The cathode terminal of the diode 91 is electrically connected to the second output terminal 43. The primary-side circuit 51 and the secondary-side circuit 61 are isolated from each other by the first capacitor C1 and the second capacitor C2. The second converter 50 shown in FIG. 15 has the same advantages as those achieved in the embodiment.

In the first embodiment, the fifth switching element Q5, which is the first element, and the sixth switching element Q6, which is the second element, may be diodes. In this case, the diodes are arranged such that a direction from the second output line L2 to the first output line L1 is the forward direction. The anode terminal of the diode that serves as the first element is electrically connected to the cathode terminal of the diode that serves as the second element. The cathode terminal of the diode that serves as the first element is electrically connected to the first output line L1. The anode terminal of the diode that serves as the second element is electrically connected to the second output line L2.

In each embodiment, the external power supply PS may be a direct-current power supply. In this case, the power conversion device 20 does not need to include the fifth switching element Q5 or the sixth switching element Q6. When the positive electrode of the direct-current power supply is connected to the input terminal 21, the negative electrode may be connected to the second output line L2. When the negative electrode of the direct-current power supply is connected to the input terminal 21, the positive electrode may be connected to the first output line L1. When the external power supply PS of the second embodiment is a direct-current power supply, the second element may be a diode.

In each embodiment, the reactor 32 is arranged at the first terminal T1 side of the external power supply PS. However, the reactor 32 may be arranged at the second terminal T2 side, or may be arranged at both sides. In other words, the reactor 32 may be arranged on at least one of the first input line L3 and the second input line L4.

In the first embodiment, the second converter 50 may step up the input voltage and output the stepped-up voltage, or may step down the input voltage and output the stepped-down voltage.

In each above embodiment, the power conversion device 20 may convert power input from the high-voltage battery 11 into alternating-current power and output the power conversion device from the input terminal 21, 22. For example, the controller 71 alternately switches the switching pattern of the first to sixth switching elements Q1 to Q6 between a seventh pattern and an eighth pattern. The seventh pattern is a switching pattern in which the first switching element Q1 is switched on, the second switching element Q2 is switched on, the third switching element Q3 is switched off, the fourth switching element Q4 is switched off, the fifth switching element Q5 is switched off, and the sixth switching element Q6 is switched on. The eighth pattern is a switching pattern in which the first switching element Q1 is switched off, the second switching element Q2 is switched off, the third switching element Q3 is switched on, the fourth switching element Q4 is switched on, the fifth switching element Q5 is switched on, and the sixth switching element Q6 is switched off.

In the first embodiment, the second converter 50 may be an isolated DC/DC converter in which the primary-side circuit and the secondary-side circuit are electrically isolated from each other by a transformer.

Figure 16:
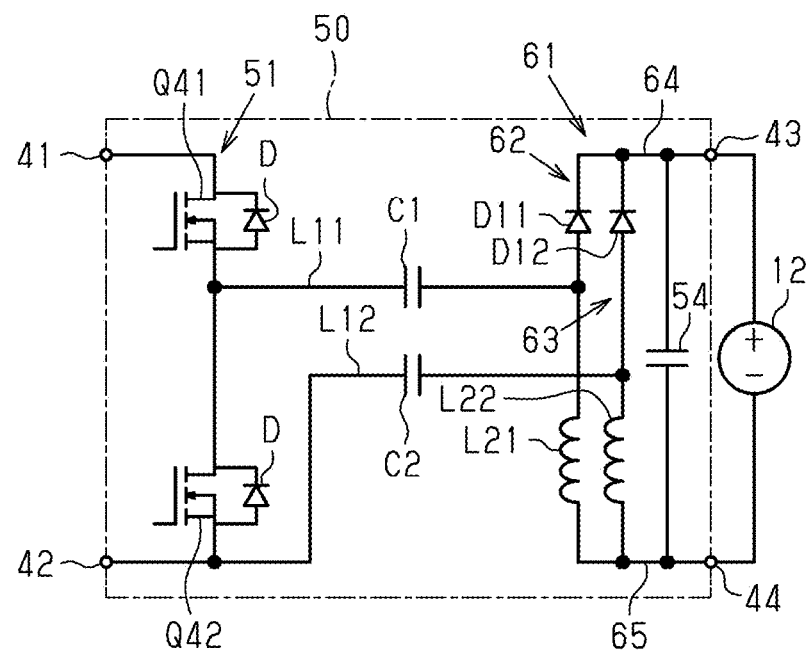
FIG. 16 is a diagram showing a modification of the second converter.

In each embodiment, as shown in FIG. 16, the first coil L21 and the first diode D11 may be swapped, and the second coil L22 and the second diode D12 may also be swapped. In this case, the wire 64 is the second wire. The wire 65 is the first wire.

The cathode terminals of the first diode D11 and the second diode D12 are electrically connected to the positive one of the second output terminals 43, 44. The anode terminal of the first diode D11 is electrically connected to the first coil L21. The anode terminal of the second diode D12 is electrically connected to the second coil L22. Thus, the anode terminals of the first diode D11 and the second diode D12 are electrically connected to the negative one of the second output terminals 43, 44 via the coils L21, L22.

In the second embodiment, the secondary-side circuit 61 may further include a leg. The leg is formed by connecting a coil and a diode in series. In this case, the coil of the leg and the coils L21, L22 of the legs 62, 63 are connected by the first wire, and the diode of the leg and the diodes D11, D12 of the legs 62, 63 are connected by the second wire.

In each embodiment, the second converter 50 may be a series resonant circuit having a circuit configuration different from that of the embodiments.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A power conversion device, comprising:
   two input terminals configured to be electrically connected to an external power supply;
   a first converter configured to convert power input from the external power supply via the two input terminals; and
   two first output terminals configured to output power converted by the first converter, wherein
   the first converter includes
      a switching circuit in which a first switching element, a second switching element, a third switching element, and a fourth switching element are connected in series to each other in this order,
      a flying capacitor electrically connecting a connection node between the first switching element and the second switching element to a connection node between the third switching element and the fourth switching element,
      a reactor,
      a first output line electrically connecting one of the two first output terminals to one end of the switching circuit,
      a second output line electrically connecting the other one of the two first output terminals to another end of the switching circuit,
      a first input line electrically connecting one of the two input terminals to a connection node between the second switching element and the third switching element, and
      a second input line electrically connecting the other one of the two input terminals to the one of the two first output terminals,
   the reactor is arranged in at least one of the first input line and the second input line,
   the power conversion device comprises
      a second converter configured to perform power conversion on a voltage across the flying capacitor as an input voltage,
      two second converter input terminals electrically connected to two ends of the flying capacitor, and
      two second output terminals configured to output power converted by the second converter,
   the second converter includes
      a primary-side circuit configured to convert power input via the two second converter input terminals into alternating-current power through switching operations of a second converter switching element and output the alternating-current power, and
      a secondary-side circuit configured to convert the alternating-current power into direct-current power and output the direct-current power to the two second output terminals, and
   the second converter is an isolated DC/DC converter in which the primary-side circuit and the secondary-side circuit are electrically isolated from each other.

2. The power conversion device according to claim 1, wherein
   the second converter includes
      a first connection line and a second connection line,
      a first capacitor arranged in the first connection line, and
      a second capacitor arranged in the second connection line, and
   the first connection line and the second connection line each include a first terminal connected to the primary-side circuit and a second terminal connected to the secondary-side circuit.

3. The power conversion device according to claim 2, wherein
   the secondary-side circuit includes
      a first leg including a first coil and a first diode connected in series to each other, the second terminal of the first connection line being connected to a connection node between the first coil and the first diode,
      a second leg including a second coil and a second diode connected in series to each other, the second terminal of the second connection line being connected to a connection node between the second coil and the second diode,
      a first wire connecting the first coil and the second coil to one of the two second output terminals, and
      a second wire connecting the first diode and the second diode to the other one of the two second output terminals,
   anode terminals of the first diode and the second diode are electrically connected to a negative one of the two second output terminals,
   a cathode terminal of the first diode is electrically connected to the first coil, and
   a cathode terminal of the second diode is electrically connected to the second coil.

4. The power conversion device according to claim 2, wherein
   the secondary-side circuit includes
      a first leg including a first coil and a first diode connected in series to each other, the second terminal of the first connection line being connected to a connection node between the first coil and the first diode,
      a second leg including a second coil and a second diode connected in series to each other, the second terminal of the second connection line being connected to a connection node between the second coil and the second diode,
      a first wire connecting the first coil and the second coil to one of the two second output terminals, and
      a second wire connecting the first diode and the second diode to the other one of the two second output terminals, cathode terminals of the first diode and the second diode are electrically connected to a positive one of the two second output terminals, an anode terminal of the first diode is electrically connected to the first coil, and an anode terminal of the second diode is electrically connected to the second coil.

5. The power conversion device according to claim 1, wherein the external power supply is an alternating-current power supply including a first terminal electrically connected to a first input terminal, which is one of the two input terminals, and a second terminal electrically connected to a second input terminal, which is the other one of the two input terminals, the first converter includes
- a positive line electrically connecting the second input line to the first output line,
- a negative line electrically connecting the second input line to the second output line,
- a first element arranged on the positive line, and
- a second element arranged on the negative line, and the first element and the second element are configured such that a current flows from the second element to the second input line when the first terminal is positive, and that a current flows from the second input line to the first element when the second terminal is positive.

6. The power conversion device according to claim 5, further comprising a switch configured to connect the first input terminal to the second input terminal, wherein the first element is a switching element.

7. The power conversion device according to claim 1, wherein the power conversion device is mounted on a vehicle, a high-voltage battery is electrically connected to the two first output terminals, and a low-voltage battery is electrically connected to the two second output terminals.

\* \* \* \* \*